(12) United States Patent
Stephan et al.

(10) Patent No.: US 8,729,487 B2
(45) Date of Patent: May 20, 2014

(54) NEUTRON DETECTOR AND METHOD OF MAKING

(75) Inventors: Andrew C. Stephan, Knoxville, TN (US); Vincent D. Jardret, Powell, TN (US)

(73) Assignee: Material Innovations, Inc., Powell, TN (US)

(*) Notice: Subject to any disclaimer, the term of this patent is extended or adjusted under 35 U.S.C. 154(b) by 129 days.

(21) Appl. No.: 13/200,022

(22) Filed: Sep. 15, 2011

(65) Prior Publication Data

US 2013/0068957 A1    Mar. 21, 2013

(51) Int. Cl.
*G01T 3/00*    (2006.01)
*G01T 1/185*   (2006.01)

(52) U.S. Cl.
USPC ............... 250/390.01; 250/374; 250/382

(58) Field of Classification Search
USPC ................................ 250/374, 382, 390.01
See application file for complete search history.

(56) References Cited

U.S. PATENT DOCUMENTS

| | | | |
|---|---|---|---|
| 2,845,560 A | 7/1958 | Curtis et al. | |
| 2,879,423 A | 3/1959 | Bayard | |
| 3,102,198 A | 8/1963 | Bonner | |
| 3,240,971 A | 3/1966 | Morgan | |
| 3,359,443 A * | 12/1967 | Givens | 376/153 |
| 3,702,409 A | 11/1972 | Goodings et al. | |
| 3,956,654 A | 5/1976 | Gleason | |
| 3,984,691 A * | 10/1976 | Allemand et al. | 250/385.1 |
| 4,301,368 A * | 11/1981 | Riihimaki | 250/385.1 |
| 4,447,727 A * | 5/1984 | Friesenhahn | 250/390.01 |
| 7,002,159 B2 | 2/2006 | Lacy | |
| 7,514,694 B2 | 4/2009 | Stephan et al. | |
| 7,919,758 B2 | 4/2011 | Stephan et al. | |
| 7,923,698 B2 | 4/2011 | Stephan et al. | |
| 2006/0023828 A1 | 2/2006 | McGregor et al. | |
| 2006/0043308 A1 | 3/2006 | McGregor et al. | |
| 2006/0056573 A1 | 3/2006 | McGregor | |
| 2010/0314549 A1 * | 12/2010 | Wang et al. | 250/390.01 |

FOREIGN PATENT DOCUMENTS

WO    WO 2011025853 A1 *  3/2011

OTHER PUBLICATIONS

P. M. Dighe et al, "Boron-lined proportional counters with improved neutron sensitivity," Nuclear Instruments and Methods A 496, pp. 154-161 (2003).

P. M. Dighe, "New cathode design boron lined proportional counters for neutron area monitoring application," Nuclear Instruments and Methods A 575, pp. 461-465 (2007).

(Continued)

*Primary Examiner* — David Porta
*Assistant Examiner* — Jeremy S Valentiner
(74) *Attorney, Agent, or Firm* — Robert J. Lauf

(57) ABSTRACT

A neutron detector comprises at least two conductive cathode sheets lying parallel to one another and coated with neutron reactive material on at least one side thereof; dielectric material separating the cathode sheets and covering less than about 80% of their surface area; and a plurality of anode wires lying generally parallel to the cathode sheets and separated from them by the dielectric, with the distance between adjacent anode wires being no more than twenty times the distance between said cathode sheets. The cathode sheets may be flat or curved; they may be separate plates or they may be successive folds or windings of a single folded or spiral-shaped metal sheet. Related methods for building the detector are disclosed.

18 Claims, 16 Drawing Sheets

(56) References Cited

OTHER PUBLICATIONS

A. Breskin et al., "A fast, bidimensional position-sensitive detection system for heavy ions," Nuclear Instruments and Methods 148, pp. 275-281 (1978).

M. Nakhostin et al., "A fast response and insensitive neutron detector based on parallel-plate avalanche counter," Radiation Protection Dosimetry 129, pp. 426-430 (2008).

S. Andriamonje et al., "Experimental studies of a Micromegas neutron detector," Nuclear Instrument and Methods A 481, pp. 120-129 (2002).

S. Andriamonje et al., "New neutron detectors based on Micromegas technology," Nuclear Instruments and Methods A 525, pp. 74-78 (2004).

G. Charpak et al., "Multiwire proportional chambers and drift chambers," Nuclear Instruments and Method 162, pp. 405-428 (1979).

G. Giorginis et al., "A three dimensional He-recoil MWPC fast polarized neutrons," Nuclear Instruments and Methods in Physics Research A 251, pp. 89-94 (1986).

R. B. Knott et al., "A large 2D PSD for thermal neutron detection," Nuclear Instruments and Methods A 392, pp. 62-67 (1997).

G. Melchart et al., "The multistep avalanche chamber as a detector for thermal neutrons," Nuclear Instruments and Methods 186, pp. 613-620 (1981).

C.L. Morris et al., "Multi-wire proportional chamber for ultra-cold neutron detection," Nuclear Instruments and Methods in Physics Research A 599 248-250 (2009).

Z. Wang et al. "Multi-layer boron thin film detectors for neutrons", in press in Nuclear Instruments and Methods in Physics research A, (Oct. 2011).

* cited by examiner

NEUTRON DETECTOR AND METHOD OF MAKING

CROSS REFERENCE TO RELATED APPLICATION

This application is related to U.S. patent application Ser. No. 13/200,023 entitled, Neutron Detector and Method of Making, filed by the present inventors on even date herewith, the entire disclosure of which is incorporated herein by reference.

BACKGROUND OF THE INVENTION

1. Field of the Invention

The invention pertains to apparatus and methods for detecting neutrons and more particularly to neutron detectors containing generally parallel or concentric detecting elements made of thin sheet-like material coated with neutron-reactive materials.

2. Description of Related Art

Conventional Neutron Detector Tubes

Tubular helium-3 proportional counters have been the most common type of neutron detector in use for some years, such as described by Bonner in U.S. Pat. No. 3,102,198 and Morgan in U.S. Pat. No. 3,240,971. Boron trifluoride ($BF_3$) gas was originally commonly used for neutron detection and was replaced by He-3 based detectors in the 1960's when He-3 became available (see, for example, Goodings and Walgate Leake in U.S. Pat. No. 3,702,409 and Bayard in U.S. Pat. No. 2,879,423). $BF_3$ detectors present major drawbacks compared to He-3 detectors, including the toxicity of the gas, and a commonly recognized limitation of the pressure for effective operation of the detector, which limits the potential sensitivity of these detectors, compared to conventional counters that can be filled with 10 or 20 atmospheres of He-3. An alternative to using a neutron-reactive gas is to line a gas-filled chamber with a neutron-reactive solid, such as boron-10 (see, for example, Curtis et al. in U.S. Pat. No. 2,845,560 and Gleason in U.S. Pat. No. 3,956,654) or lithium-6.

Neutron detectors based on boron-10 lined tubes have attracted increased attention in recent years because of a supply shortage of He-3 gas and a consequent surge in price, making He-3 uneconomic for many neutron detection applications. A disadvantage of boron-lined tubes compared to detector tubes containing helium-3 or boron trifluoride is that the former normally has a substantially lower neutron detection sensitivity than the latter due to the self-shielding of boron-10 neutron capture reaction products by the solid coating containing the boron (other solids also experience this effect). One approach to achieving higher neutron detection efficiency with boron-lined tubes is to use a multiplicity of smaller diameter boron-lined tubes in place of a single larger tube; this approach works by increasing the solid boron surface area (and thus the neutron detection sensitivity) per unit volume of detector. Thermal neutron detection efficiencies for commercially available boron lined tubes are typically in the range of 3 to 6%, which is very low compared to the 60 to 70% thermal neutron detection efficiency of a typical two inch diameter tube detector filled with 3 atmospheres of He-3. Centronic, GE, Proportional Technologies Inc., and other companies have sought to provide a He-3 replacement using this approach, with a number of smaller diameter boron-lined tubes bundled into a single detector enclosure whose size is appropriate for substituting it in place of a He-3 detector tube or system. Drawbacks to using smaller diameter tubes include greater difficulty in coating the inside surface of the tubes with boron or other neutron-reactive material and in inserting a thin anode wire into the tube, particularly if the tube is small (e.g. Proportional Technologies' straw tubes are 4 mm in diameter and can be up to six feet long). Although the companies mentioned have developed engineering solutions for manufacturing these detectors, it remains the case that the smaller the tube diameter, the greater the number of tubes required to provide a performance-equivalent replacement for a He-3 tube detector of a given size, resulting in an obvious cost increase.

Boron Straw Tubes

Lacy describes a boron coated straw neutron detector in U.S. Pat. No. 7,002,159. Conceptually, the boron coated straw neutron detector is a type of tubular boron-lined proportional counter with some advantages over traditional boron-lined tubes, one of which is the use of a thin walled straw that can be fabricated by rolling up a thin boron-coated sheet instead of using a metal tube to form the body of the detector. One advantage of this process is that it allows the inner surface of the tube to be coated with boron while in a substantially flat form before being rolled into a small diameter tube. On the other hand, boron coated straw neutron detectors normally use a central anode wire just as boron-lined neutron counters do, and this approach does not simplify the difficult task of sliding the wire into the straw.

Boron Lined Tubes with Baffles

Dighe et al. describe two approaches to increasing neutron detection sensitivity by increasing the boron-coated surface area inside a single tube [P. M. Dighe et al, "Boron-lined proportional counters with improved neutron sensitivity," Nuclear Instruments and Methods A 496, pp. 154-161 (2003)]. The first approach is to simply use smaller diameter boron-lined tubes, with a group of such tubes held inside a containment structure (e.g. a single larger tube), with the smaller tubes sharing a common connector for supplying the operating voltage and providing the neutron detection signal out. The second approach consists of mounting boron-coated baffles inside a tube and spaced along the length of the tube. In a later work, Dighe describes the results obtained from adding boron-lined baffles to the interior of a boron-lined tube; Dighe reports a measured neutron sensitivity almost 2.8 times higher than that of a comparable boron-lined tube containing no boron-lined baffles. [P. M. Dighe, "New cathode design boron lined proportional counters for neutron area monitoring application," Nuclear Instruments and Methods A 575, pp. 461-465 (2007)]. Dighe et al. present pulse height spectra that show a logarithmic increase in counts with decreasing pulse amplitude within the low pulse amplitude range, making the actual neutron detection efficiency significantly sensitive to the lower level discriminator (LLD) value used to discriminate out electronic noise and gamma induced pulses from the neutron signal. Dighe does not propose any means of improving the pulse height spectrum to enhance the ability to reject electronic noise and gamma rays without losing neutron pulses.

Micro Neutron Detectors

McGregor et al. in U.S. Patent Application 2006/0043308 disclose micro neutron detectors based on components (usually two substrates with cavities in them) that are fitted together in a gaseous environment to form a gas-filled pocket that acts as a neutron detector. Neutron sensitivity is achieved by having a neutron-reactive material present in the detector, such as a thin layer of a neutron-reactive solid coating one of the interior surfaces of the detector. McGregor et al. disclose additional variations and uses of this technology in U.S. Patent Applications 2006/0023828 and 2006/0056573. In the disclosed detector configuration, McGregor et al. indicate how two generally flat surfaces serve as electrodes (namely the anode and cathode), but do not teach how one would reduce the capacitance induced noise that results when placing large panels in close proximity to each other when fabricating a large area detector, nor do they provide a means for amplifying the signal relative to this increased noise to improve the signal-to-noise ratio.

Parallel Plate Avalanche Chamber (PPAC)

A Parallel Plate Avalanche Chamber (PPAC) comprises two parallel plates that function as an anode and a cathode with ionizations created in the detector gas by a radiation particle producing an electron avalanche that is the measured signal. Thanks to the small distance between the electrodes, the entire region between the electrodes normally functions as an electron multiplication region.

Proportional counters (e.g. He-3 tube detectors) typically have a large drift region (where the electric field strength is comparatively lower) and a smaller amplification region (where the electric field strength is stronger) in which gas gain (electron multiplication) occurs. When a radiation particle interacts with the detector and deposits energy in the detector gas, it is usually the case that most or all of this energy is deposited in the drift region in the form of ionizations (ion-electron pairs). When the electrons are drawn into the amplification region by the influence of the electric field, they undergo multiplication in the amplification region. As a result, the amplified signal is essentially proportional to the number of electrons initially liberated by the radiation particle in the drift region, which in turn is proportional to the energy deposited in the detector by the radiation particle.

PPACs stand in contrast to proportional counters in this matter. In a PPAC, the entire gas chamber in the detector acts as an amplification region. A consequence of this is that an electron liberated by a radiation particle close to the cathode will experience a greater amount of gain due to having a greater distance to travel to the anode than an electron liberated closer to the anode. As a result, proportionality is lost between energy deposition by a radiation particle and the amplitude of the resulting pulse measured at the anode. This loss of proportionality is undesirable because it undermines the ability to differentiate between different types of radiation based on the amplitude of the detection pulses (e.g. neutrons are often distinguished from gammas by counting pulses above a threshold amplitude level as neutrons and rejecting pulses below that level on the presumption that they are gammas).

As PPACs use plates covering the entire side of a detector as electrodes (as opposed to electrodes having a smaller area, such as wires or mesh), their capacitance per unit area of detector size is quite high. Laboratory experiments are a common application for PPACs as their flat shape tends to make them sensitive to vibration. It only takes a small deflection of the plates comprising the detector to create a large transitory fluctuation in the capacitance, thereby producing a charge pulse spike at the input of the readout electronics. In these circumstances even a small acoustic pressure wave (sound) may generate appreciable deflection of these plates [A. Breskin et al., "A fast, bidimensional position-sensitive detection system for heavy ions," Nuclear Instruments and Methods 148, pp. 275-281 (1978) and M. Nakhostin et al., "A fast response and γ-insensitive neutron detector based on parallel-plate avalanche counter," Radiation Protection Dosimetry 129, pp. 426-430 (2008)].

Micromegas Detector

The Micromegas (MicroMEsh GAseous Structure) is quite similar in design to a PPAC, with the difference that a drift electrode is located a short distance above the anode, dividing the space between the anode and cathode into two regions; a drift zone (operating in ionization mode) and a signal amplification zone (operating in proportional mode). This division results in retention of proportionality between the energy deposition in the detector gas by the radiation particle interaction and the signal amplitude (for radiation particles depositing their energy in the drift zone, rather than the amplification zone, which is most of them). To enable neutron detection, a thin coating of neutron-reactive material such as boron-10 or lithium-6 can be placed on the cathode [S. Andriamonje et al., "Experimental studies of a Micromegas neutron detector," Nuclear Instrument and Methods A 481, pp. 120-129 (2002) and S. Andriamonje et al., "New neutron detectors based on Micromegas technology," Nuclear Instruments and Methods A 525, pp. 74-78 (2004)]. This detector design requires very precise positioning between the Frisch grid and the anode as well as significant structural rigidity of the structure to ensure stable operation of the detector. A rigid substrate such as a quartz plate is often used and standoffs are employed to hold the Frisch grid at a constant distance from the anode. A major advantage of the Frisch grid rather than an anode wire as in standard tubular proportional tubular counters (He-3 tubes) is that the electric field in the drift region can be controlled generally independently of the gain obtained in the electron multiplication zone. This also allows detection pulses to be generated from electron and ion drift between the Frisch grid and the anode (rather than between the cathode and the anode), enabling high time resolution (e.g. tens of nanoseconds or less) of use in applications such as in neutron spallation experiments. Using the standard wire approach (rather than a Frisch grid approach), the voltage potential between the anode and cathode controls both the gas gain and the electron drift velocity at the same time. The major drawback of the Micromegas is that each anode can only read from one neutron reactive surface. If one were to place an anode on each side of a single substrate, the detector capacitance would increase to the same extent as if the two anodes were separate, thus increasingly the electronic noise level, and the minimum required thickness of the substrate would increase the overall thickness of the device.

Multiwire Proportional Counters (MWPCs)

Multiwire Proportional Counters (MWPCs) are two-dimensional radiation imaging detectors that use a series of thin wires as anodes. The use of wires for anodes causes the electric field to be concentrated around the wires, creating an electron amplification region in the immediate vicinity of the wires and causing the detector to operate in proportional mode. By measuring and comparing the signal amplitude generated on the different anode wires by a single radiation particle interaction event, the position of the interaction event can be deduced. MWPCs are used primarily in laboratory settings, such as position-sensitive neutron detection in neutron scattering experiments. A drawback to traditional MWPC design is its flatness and use of long pieces of unsupported anode wires, rendering it susceptible to microphonics noise (e.g. when used in a non-laboratory environment) [G. Charpak et al., "Multiwire proportional chambers and drift chambers," Nuclear Instruments and Methods 162, pp. 405-428 (1979), G. Giorginis et al., "A three dimensional He-recoil MWPC for fast polarized neutrons," Nuclear Instruments and Methods in Physics Research A 251, pp. 89-94 (1986), and R. B. Knott et al., "A large 2D PSD for thermal neutron detection," Nuclear Instruments and Methods A 392, pp. 62-67 (1997)]. Melchart et al. disclose a variant on the MWPC concept in which an MWPC was placed beside a set of mesh electrodes with an electric field between them sufficient to produce electron multiplication. A layer of gadolinium (a neutron-reactive material) was included in the detector on one side of the gas chamber to provide neutron sensitivity. [G. Melchart et al., "The multistep avalanche chamber as a detector for thermal neutrons," Nuclear Instruments and Methods 186, pp. 613-620 (1981)].

More recently, Wang and Morris [C. L. Morris et al., "Multi-wire proportional chamber for ultra-cold neutron detection," Nuclear Instruments and Methods in Physics Research A 599, pp. 248-250 (2009) and Z. Wang et al. "Multi-layer boron thin film detectors for neutrons", in press in Nuclear Instruments and Methods in Physics research A] adapted a planar He-3 based multi-wire detector for use with boron coated cathode as neutron reactive conversion media in a multi-layer configuration. The authors found that obtaining sufficient robustness against electronics noise and microphonics for successful operation of the detector device required operation with gas gain, which required very high dimensional tolerance in positioning the anode and cathode planes. The authors indicate that they achieved a 100 µm precision in wire spacing and plane spacing in the He-3 based detector with a 2.5 mm spacing between the anode plane and the cathode planes. The boron-based device had about 10% or less variation in spacing between the different layers with the separation between the anode and the cathodes being 3.3 mm thus this corresponds to a precision of 0.33 mm. The authors present a pulse height spectrum for a single layer showing (as expected) sharp peaks corresponding to the two types of reaction products released by the neutron capture reaction in boron-10. However, in the multi-layer device (combining measurements from four boron layers), the spectrum lost the sharp peaks indicating the gain may be different for each layer due to variations in anode-cathode spacing and thus this design may have issues with repeatability. These tolerance issues briefly introduced by the authors will have increasingly greater impact on devices in which the distance between the cathodes and the anodes is smaller.

Objects and Advantages

Objects of the present invention include the following: providing a more efficient (sensitive) neutron detector, both on an absolute and a per-volume basis; providing a neutron detector that more effectively discriminates neutrons from other types of ionizing radiation; providing a gas-filled neutron detector with improved signal characteristics; providing a gas-filled neutron detector with reduced voltage and power requirements; providing a gas-filled neutron detector that is easier and less expensive to manufacture; providing a gas-filled neutron detector of enhanced field-ruggedness; providing a gas-filled neutron detector that can be filled with multiple types of gases; and providing a gas-filled neutron detector that can be formed into many different shapes and sizes. These and other objects and advantages of the invention will become apparent from consideration of the following specification, read in conjunction with the drawings.

SUMMARY OF THE INVENTION

According to one aspect of the invention, a neutron detector comprises:
at least two conductive cathode sheets disposed parallel to one another, the conductive sheets having a thickness less than about 2 mm and coated with neutron reactive material on at least one side thereof;
dielectric material separating the cathode sheets, the dielectric material having a thickness less than about 5 mm and covering less than about 80% of the surface area of the cathode sheets;
a plurality of anode wires of diameter less than about 1 mm, generally parallel to the cathode sheets and separated therefrom by the dielectric, the distance between adjacent anode wires being no more than 20 times the distance between the cathode sheets; and,
an ionizable gas in the space adjacent to the cathode sheets and the anode wires.

According to another aspect of the invention, a neutron detector comprises:
a conductive cathode sheet having a thickness less than about 1 mm, coated with neutron reactive material on at least one surface thereof, and formed into a selected shape in which selected portions of the sheet are facing other selected portions of the sheet;
dielectric material separating the facing portions, the dielectric material having a thickness less than about 5 mm and covering less than about 80% of the surface area of the facing portions of the cathode sheet;
a plurality of anode wires of diameter less than about 1 mm, generally parallel to the facing portions of the cathode sheet and separated therefrom by the dielectric, with the distance between adjacent anode wires being no more than 20 times the distance between the facing portions of the cathode sheet; and,
an ionizable gas in the space adjacent to the cathode sheets and the anode wires.

According to another aspect of the invention, a neutron detector comprises:
a substrate;
an adhesive layer on a selected surface of the substrate; and,
a layer of neutron-reactive inorganic powder adhering to the outer surface of the adhesive layer, the inorganic powder comprising an isotope selected from the group consisting of: boron-10 and lithium-6.

According to another aspect of the invention, a method of making a neutron detector comprises the steps of:
a) forming a first conductive cathode sheet;
b) depositing a neutron-reactive coating onto a selected area of the first cathode sheet, the coating comprising an inorganic material containing an isotope selected from the group consisting of: boron-10 and lithium-6;
c) attaching a first dielectric sheet to the coated surface of the first cathode sheet, the dielectric sheet having openings therein so that it covers no more than about 80% of the area of the first cathode sheet;
d) attaching a plurality of anode wires to the first dielectric sheet, the anode wires disposed generally parallel to the surface of the first cathode sheet and separated therefrom by the first dielectric sheet;
e) attaching a second dielectric sheet of similar shape to the first dielectric sheet on top of the anode wires;
f) forming a second cathode sheet;
g) depositing a neutron-reactive coating onto a selected area of the second cathode sheet;
h) attaching a second cathode sheet to the second dielectric sheet so that a cavity is formed, having the anode wires and neutron-reactive coatings contained therein, and,
i) placing an ionizable gas in the space adjacent to the cathode sheets and surrounding the anode wires.

According to another aspect of the invention, a method of making a neutron detector component comprises the steps of:
a) forming a substrate;
b) applying an adhesive layer to a selected surface of the substrate;

c) applying a layer of neutron-reactive powder to the exposed surface of the adhesive layer so that individual particles adhere to the adhesive; and, d) brushing the powder layer to remove loose particles.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
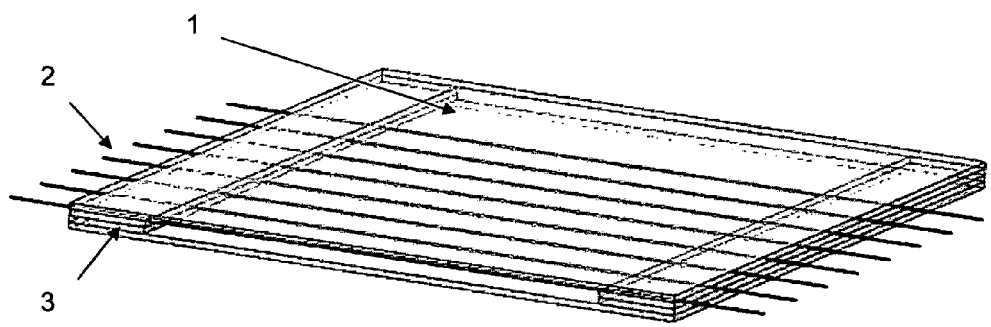
FIG. 1 illustrates a neutron detector unit according to one example of the invention, comprising a conductive sheet, coated with neutron-reactive material, a set of two dielectric sheets, sandwiching a set of anode conductors and applied against the coated side of the conductive sheet. A second conductive sheet-like material is applied against the open surface of the dielectric sheet-like material.
Figure 2:
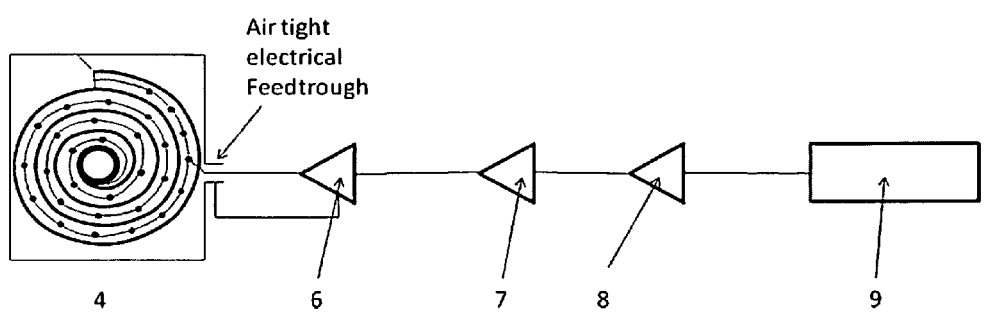
FIG. 2 illustrates schematically one arrangement of a detector and electronic readout components for detecting neutron capture events in the detector, which include a charge sensitive preamplifier, a shaping amplifier, a multi-channel analyzer or combination of a lower level discriminator (LLD) used for pulse height discrimination and a counter for data acquisition. A computer can be used for data recording, analysis and visualization.

The present invention is a neutron detector that incorporates one or more layers of sheet-like conducting material 1 coated on at least one side with a neutron-reactive material maintained generally parallel or concentric by a sandwich made of a conductive anode(s) held between two dielectric sheet-like materials 3, in which the dielectric materials maintain the conductive anode(s) 2 substantially parallel and at a uniform distance from the conducting sheet-like material as depicted generally in FIG. 1. Because of the electric field it produces, the anode conductor is capable of creating electron multiplication in the gas around it. The dielectric materials present openings, preferably representing more than 20% of the surface area of the dielectric sheet, creating small gas volumes between the conducting sheets. These gas chambers are made to be in contact with the anode conductor and the neutron-reactive material placed against the conductive sheet, such that neutron interactions in the neutron-reactive material are capable of producing one or more energetic particles that travel into or through the gas inside the gas chamber and deposit energy in the form of ionizations (ions and free electrons) in the gas. The size of these gas chambers is sufficient to enable efficient neutron induced pulses but not so big as to enable gamma induced particles (e.g., a primary electron) to deposit large amounts of energy in these chambers and create large pulses that can be mistaken for neutron pulses. An electric field is applied by creating a differential potential between the anode conductor and the conductive sheet-like cathode material; under the influence of this electric field, the electrons created in the gas chambers move through the gas until they reach and are stopped by the anode surface. Similarly, the ions move through the gas until they reach and are stopped by the cathode surface. (Some ions and electrons may be lost to other effects such as electron-ion recombination and electron capture by electronegative species.) As the electrons and ions move through the gas volume under the influence of the electric field, they produce a current pulse on the electrodes. This current pulse from detector 4 can be detected and measured using conventional radiation detection electronics, such as a charge-sensitive preamplifier 6, shaping amplifier 7, and a lower level discriminator (LLD)/counter module 8 or computer-based multichannel analyzer (MCA) 9 and software or a miniaturized electronics package for integration with the neutron detector into a complete self-contained device capable of the above mentioned functionality as illustrated generally in FIG. 2.

In order for a gas-filled neutron sensor to operate optimally, there are a number of aspects to its design and operation that may be considered. These include the following.

Design requirements regarding boron layer thickness and necessity for multi-layer system It is well-established that when using solid neutron-reactive materials such as boron-10 and lithium-6 coating for neutron detection, there are limitations to the useful thickness of such coatings due to self-shielding by the coating material, limiting the sensitivity a single coating layer can exhibit, and motivating the use of multi-layered systems. Extensive studies have determined the performance of multi-layered systems containing either or both B-10 and Li-6 as converter materials (see, e.g. the cited papers by McGregor, Lacy, Wang).

Figure 3:
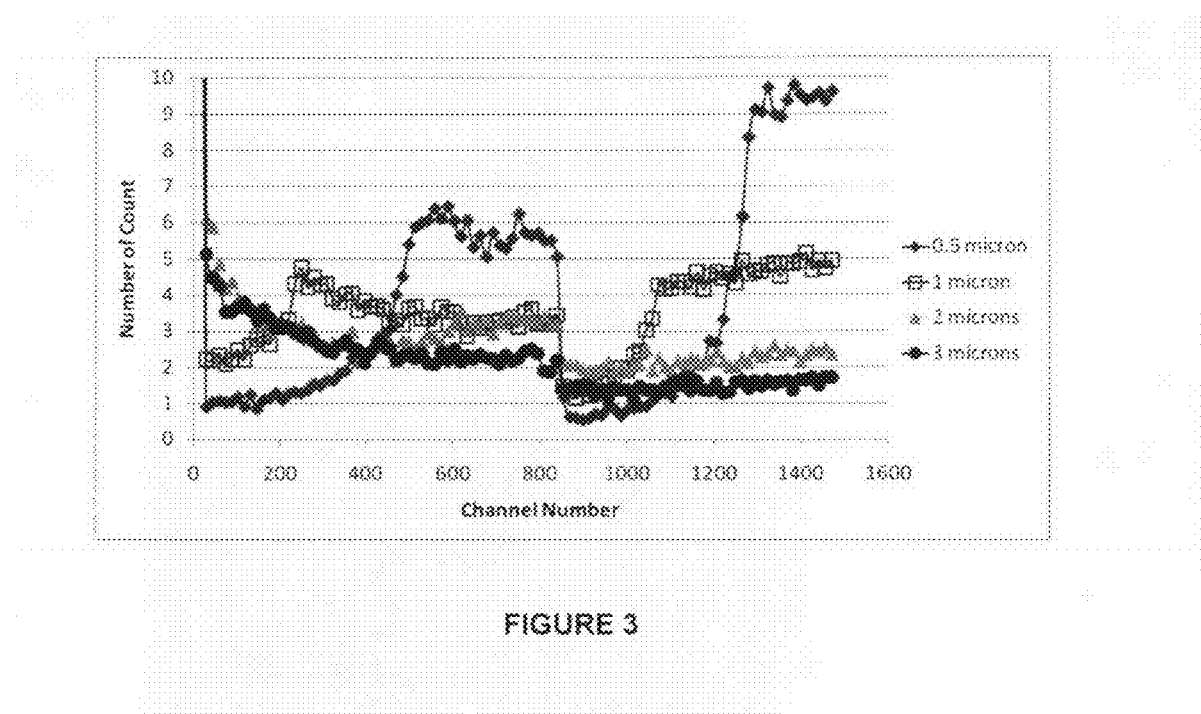
FIG. 3 illustrates schematically a pulse height spectrum expected from a boron-lined detector in which the boron layer has a thickness of a) 0.5 μm, b) 1 μm, c) 2 μm, and d) 3 μm. The gas volume in which reaction products can deposit their energy is assumed to be infinite. Results were obtained using a computer-based physics model.
Figure 4:
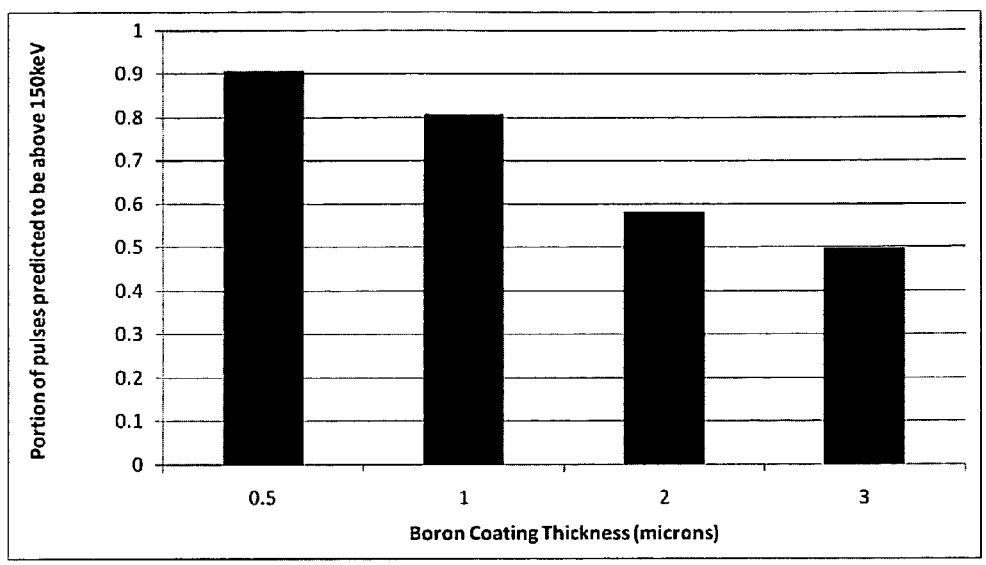
FIG. 4 illustrates schematically the expected proportion of neutron capture events capable of creating ionizations of more than 150 keV for four different boron-10 coating thicknesses. The gas volume next to the coating is assumed to be infinite.
Figure 5:
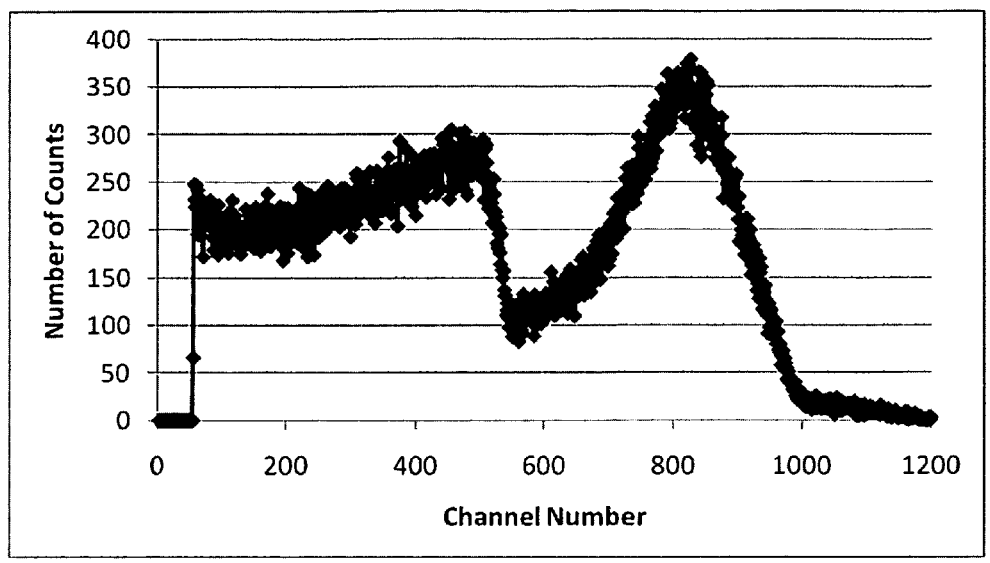
FIG. 5 illustrates an example of the pulse height spectrum measured from a 1.9 cm diameter tube filled with one atmosphere of Ar and lined on the inside with a layer of boron carbide averaging 0.5 μm thick.

In a boron lined detector, a neutron is captured by a boron-10 atom that emits two energetic reaction products in the form of an alpha (1.47 MeV) and a lithium-7 (0.84 MeV) particle. These two particles are expelled from the neutron capture event location and travel in generally opposite directions from each other, due to conservation of momentum. As they move through a material, these particles deposit their energy, giving them a finite travel range, the specific range depending on the type and density of the material and type and energy of the particle. For instance, in boron metal with a density of 2.0 grams per cubic centimeter, the travel range of the alpha and lithium-7 particles are 3.5 µm and 1.8 µm, respectively. (Boron carbide has a density of 2.5 g/cc and particle ranges are proportionately shorter due to the greater density.) This limited travel range implies that a neutron capture event occurring at a distance greater than 2 to 3 µm from the surface of the neutron-reactive material (and thus from the gas volume of the detector) will not generate any detection signal since the reaction products will be unable to reach the gas volume of the detector (the gas volume is the active volume of the detector where deposited energy is converted into ionizations that are measured as pulses in the detector). Neutron capture events occur at random locations in the neutron-reactive coating (and thus at a random distance from the surface). Given the identity and properties (e.g. density, thickness) of the neutron-reactive coating, one can simulate the expected amount of energy these reaction product particles have when they reach the gas region of the detector. (The energies of reaction products entering the gas region of the detector are not all the same but follow a distribution that varies according to the properties of the neutron-reactive coating. This distribution can be estimated quite accurately using physics simulations. Additionally, the probability that none of the reaction products emitted due to a neutron capture will reach the gas region—and thus fail to deposit any energy and not produce a signal—can be determined as well.) FIG. 3 illustrates a plot of the energy such a particle can deposit in a detector for a given boron-10 coating thickness and FIG. 4 shows the proportion of these pulses having an amplitude greater than 150 keV. This graph shows that the thicker the coating, the lower the probability that a neutron capture will cause the sufficient energy deposition in the detector gas that is necessary to create a detection pulse signal. The inability of such a coating to generate a detection signal for each neutron capture event represents a limitation in multi-layered detector configurations. Commonly called "self shielding", this effect will reduce the number of neutrons available for subsequent layers to detect neutrons resulting in a potentially significant loss in sensitivity. As discussed by several authors and well-known in the field, the optimal boron coating thickness and composition should have two important characteristics: the proportion of boron within the coating should be at a maximum toward the open surface of the coating, and the thickness of the coating or total amount of boron content should be selected according to the number of layers in the device: for a device with few layers, comparatively more boron is desirable to achieve maximum sensitivity, for numerous layers, less boron will reduce self-shielding and increase overall device sensitivity (as additional layers add more sensitivity than is lost by decreasing the boron layer thickness). It has been established that coatings of pure boron-10 with 1 micrometer thickness represents a good compromise for high sensitivity in multi-layered detectors (Lacy, McGregor). Boron carbide is another material used for this application as it has the advantage of being significantly less expensive than boron metal, while only reducing the amount of boron-10 content by about 20% for a given mass of coating material. Artisans skilled in the art will recognize from FIG. 3 that the shape of the amplitude spectrum of deposited energy in a given system is indicative of the performance and thickness (including the self-shielding characteristics) of a given coating, when tested in a detector of sufficient volume to enable the reaction products to deposit their remaining energy once they reach the gas volume. One deposition technique of the present invention provides an effective coating consisting of a high proportion of boron carbide in contact with the detector gas with only a minimal amount of additional material that could shield the reaction products from the gas volume. In this technique, by applying boron or boron carbide particles against a tacky surface, the particles form a layer of boron presenting very good characteristics for neutron detection. In the examples described below, the average areal density of the boron carbide enriched to 96% in the B-10 isotope corresponded to an average thickness of 0.5 micrometer of boron. FIG. 5 illustrates the pulse height spectrum obtained with such a coating inside a detector tube having a diameter of 1.9 cm.

With a detection efficiency of less than 4% per layer of boron-10 coating, it has been recognized that a detector design should have many layers of coatings in order to achieve a detection efficiency above 30%. This requirement has led to the design of boron-lined tube and straw detectors with small diameter tubes, in order to increase the efficiency per volume of detector (via increasing the ratio of surface area of boron to detector volume). A better detector will therefore have many layers of boron coated substrates placed in close proximity to each other, with detection regions in between for generating signals from the boron reaction products. Applicants' realization of this leads to specific design considerations described below.

Figure 6A:
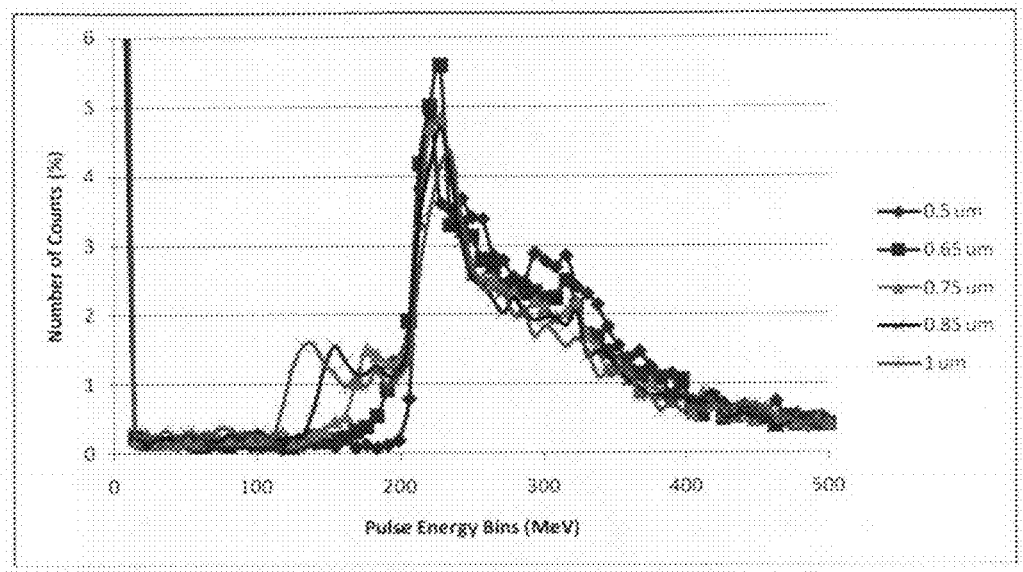
FIG. 6 illustrates schematically: A. simulated pulse height spectrum for a device constructed in accordance with Example 2, and B. pulse height spectrum for the same device measured experimentally.
Figure 6B:
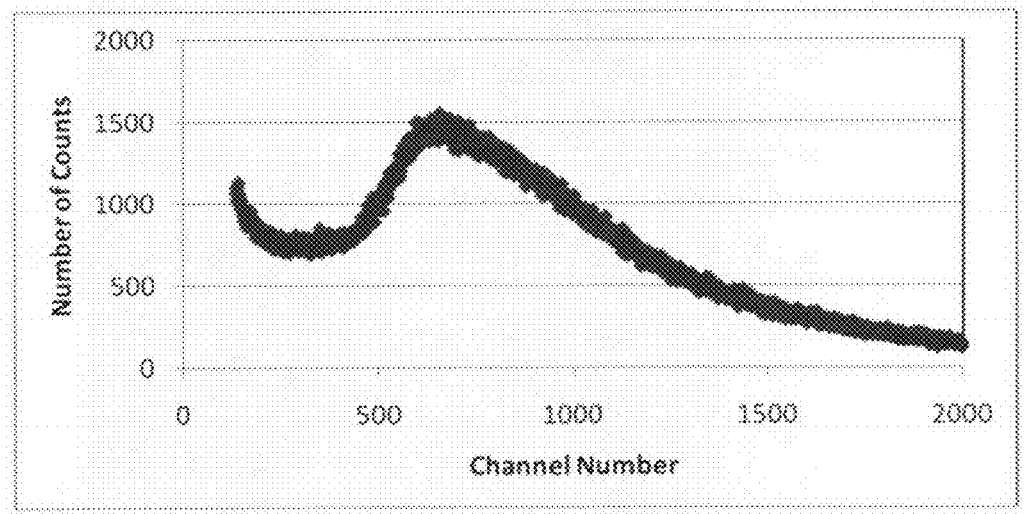

The overall thickness of a detector containing a multiplicity of layers will be positively impacted by an ability to operate well with only very small gaps between layers. Small gaps will result in the electrodes being in close proximity to each other which has several implications:

First, it will be recognized that the size of the detector gas volume can modify the detection pulse energy amplitude spectrum when the neutron capture reaction products travel through the entire gas volume without being able to deposit all of their remaining energy (see Lacy). FIG. 6A presents a pulse height spectrum simulated using the characteristics of Example 2 described later, and FIG. 6B presents the pulse height spectrum experimentally obtained with the device described in Example 2, in which the gap between the two cathodes is less than 1.5 mm.

Second, as acknowledged by Wang, et al., stringent tolerances are required to maintain the electrodes at uniform and constant distances from each other in the entire device, so that the signal produced is consistent throughout the device (e.g.

gas gain is the same throughout the device). The spectrum shown in FIG. 6B demonstrates that the amount of gas gain was consistent enough throughout the detector to produce a single pulse peak. This consistency is due primarily to the use of sheet-like dielectric materials to create a sandwich in which the anode wires are maintained firmly in place and held equidistant from the two cathode surfaces. The uniformity of the sheet like dielectric material is responsible for the consistency of the overall device operation, and enables the cost-effective construction of a device with sufficiently small dimensional tolerances.

Electrode Conductor Surface Area should be Minimized to Limit Capacitance

All else being equal, the larger a neutron detector, the larger the surface areas of the anode and cathode, and thus the greater the capacitance of the detector and the higher the resulting electronic noise level. Further, the capacitance of a detector increases as the separation distance between the anode and the cathode decreases (assuming other parameters are held constant). In the present invention, the anode and the cathode are normally quite close to each other and total cathode area and anode length are comparatively large relative to those of other neutron detectors of comparable size, creating a detector with a large capacitance compared to other classic detector designs. To keep the capacitance within a reasonable range, a very thin wire can be used in order to limit the surface area of the anode. For example, for an anode wire of 0.025 mm diameter used inside a detector unit whose cathodes are spaced about 1.5 mm apart, the capacitance created by the anode wire is approximately 13.6 pF per meter of anode wire length. In a typical 150 mm long cylindrical detector made of six layers of boron double coated conductive sheet, having an outer diameter of 31 mm, in which the anode wire is weaved every 4 mm, the total length of anode wire is about 26 meters, corresponding to about 354 pF of capacitance as in Example 2. A twelve layer concentric cylindrical detector of 300 mm length having an outer diameter of 50 mm will have a capacitance of approximately 2124 pF, which is a very large detector capacitance to use in conjunction with classic detector read-out electronics. Optimal spacing of the anode wire may vary according to detector size and desired efficiency. Closer anode wires may be used in a small device to ensure optimal sensitivity and reduce count loss to a minimum, but anode wires may be spread at a larger distance from each other in order to reduce the capacitance of the overall detector with the compromise of a modest drop in sensitivity by allowing a few percent pulses from neutron events (mostly occurring in regions far from the anode wires) to be lost due to falling below the level of the LLD. This small loss may be advantageously recovered by reducing the noise level, enabling more low amplitude neutron pulses to be counted.

Gas Gain

To reduce the impact of capacitance induced noise and increase the signal-to-noise ratio to enable efficient detection of neutrons without false alarms due to microphonics or gamma rays, it is desirable that the detector system operate with a significant amount of gas gain. The gas gain can be obtained by increasing the electric field strength within the gas chambers in the detector. Multiple schemes can be used to increase the electric field: one is to bring the anode closer to the cathodes; another is to reduce the diameter of the anode conductor (e.g. by using a thin wire), resulting in a greater concentration of the electric field around the anode, and maintaining proportionality between the energy deposited in the gas and pulse amplitude at the input of the preamplifier. Combining both schemes, the detector according to this invention presents a very high gas gain under reasonable voltages. In order for a set of substantially parallel wires to create sufficient electric field concentration and produce the required gas gain, the wires need to be separated by a large enough distance such that their individual impact on the electric field (producing a concentrated field around each of them individually) is not substantially reduced by their neighbors. At the same time, the wires need to be close enough to each other such that the electric field throughout the entire gas volume (e.g. outside the area of concentrated field strength around the anode wires) is sufficient to produce good electron drift toward the anode wires. If the wires are too far apart, relative to the distance between the cathode planes, areas of low field strength may develop in which electron drift velocity is low and many electrons are lost due to ion-electron recombination and/or captured by electronegative gases, whereby some of the neutron detection signals are lost. Spacing between wires should be no more than 20 times the distance between cathode plates, and preferably between around 0.4 and around 10 times the distance between the cathode planes in order to efficiently operate in the detector. More preferably, anode wire spacing distance between 0.8 and 5 times the distance between the cathodes provides a better compromise between the total length of anode wire per boron surface area (which impacts detector capacitance), gas gain and effective electron collection (and thus neutron detection sensitivity).

Energy Deposition and Pulse Amplitude Relationship and Impact on Neutron-Gamma Discrimination Neutron detectors are prone to producing false neutron counts when gamma radiation particles interact inside a detector. As a result, gamma rejection (i.e., neutron-gamma discrimination) is an important issue in neutron detector design. Although many factors influence the neutron-discrimination capability of a detector, proportionality (or approximate proportionality) between the energy deposition in a detector and the amplitude of the resulting detection pulse is usually a key requirement for good neutron-gamma discrimination. The reason for this is that when a gamma interacts in a neutron detector, it usually deposits substantially less energy into the detector than a neutron does when it interacts. If pulse amplitude is proportional or approximately proportional to energy deposition, most neutron pulses will be larger than most gamma pulses, enabling pulse height discrimination between neutrons and gammas using an LLD. The weaker the link between energy deposition and pulse amplitude, the greater the extent to which the observed range of neutron pulse amplitudes overlaps the observed range of gamma pulses, with a consequent reduction in the ability to reliably distinguish between neutron and gamma detection pulses.

In helium-3 proportional counters, energy deposition by a neutron usually occurs in a non-multiplying region of the gas-filled detector volume; in other words, the applied electric field in that area is sufficient to move the electrons in the direction of the anode, but is not strong enough to cause gain via electron multiplication. Energy deposition by gammas usually occurs in this same region. An anode wire is located at the center of the tube and runs down its length. The electric field strength is at a maximum in the immediate vicinity of the anode wire and electron multiplication will occur there. Under the influence of the electric field, electrons move through the non-multiplying energy deposition region and enter the amplification region immediately surrounding the anode wire. As the electrons move through this region on their way to the anode, they undergo multiplication, amplifying the signal. The gain factor is the same for both neutrons and gammas; thus the amplitude of a measured signal is proportional to the number of electrons directly created by a neutron or gamma interaction, which in turn is proportional to the energy they deposit in the detector gas.

Location of Neutron-Reactive Material

In gas-based neutron detectors incorporating solid neutron-reactive material, the location of the neutron-reactive material is an important factor in determining the practical limit of neutron detection sensitivity the detector can achieve and the fabrication methods and limits to design parameters that are feasible for the detector. If the neutron-reactive material is included in the bulk material from which the detector structure is fabricated, the detector structure must be made of very thin parts if substantial self-shielding of neutron reaction products (and thus loss of neutron detection sensitivity) is to be avoided. The reason for this is that neutron reaction products (particles produced when a neutron interacts with neutron-reactive material) usually have only a short range in solids. As noted earlier, when boron-10 captures a neutron, it releases a lithium-7 and an alpha particle. The range of these particles is around 3.5 and 1.83 μm in boron-10 metal. This means that any boron-10 atoms located more than a few μm away from the detector's gas chamber stand little to no chance of actually producing a counted neutron pulse in the detector, placing serious restrictions on the detector design in order to avoid loss of neutron detection sensitivity due to self-shielding effects. As an example, consider MCPs in which the neutron-reactive material is incorporated into the bulk material from which the MCP is fabricated. In such devices, the septal (wall) thickness between the microchannels is typically less than 10 μm. The need to have very thin walls separating very small diameter microchannels complicates the detector fabrication process.

Limiting Gamma Sensitivity

Advantageous selection of the size of the individual gas chambers/volumes created within the dielectric sheets by sandwiching with the cathode sheets can act to minimize gamma sensitivity. Gamma rays will interact with the solids in the detector, producing energetic electrons that travel through part of the detector before losing their energy and stopping. When one of these energetic electrons travels through one of the gas chambers, it deposits energy in the gas in the form of ionizations. The rate at which a particle deposits energy in a material (units of energy per unit of travel distance) is referred to as its Linear Energy Transfer rate, or LET. The LET of an electron (e.g. from a gamma interaction) is normally much lower (e.g. one hundred to one thousand times) than that of a heavy charged particle released by a neutron capture reaction. (Since particle range varies inversely with LET, this means that an electron will have a much greater range than a typical neutron capture reaction product with the same energy.) This difference in LET means that the energy deposited in a gas chamber/volume by an electron can be greatly constrained using edge effects while simultaneously having only a modest effect on neutron reaction product energy deposition if a properly sized gas chamber/volume is used. Constraining the amplitude of gamma pulses compared to neutron pulses is very desirable for obtaining better neutron-gamma discrimination for the purpose of counting neutrons while not responding to gammas. Gas chambers/volumes should be kept small in order to constrain gamma energy deposition, while not being so small as to overly constrain neutron energy deposition. According to the invention, individual gas chambers should preferably have a maximum straight internal dimension of more than 1 cm and less than 10 cm. In an advantageous configuration, the gas chambers should preferably have a thickness between 0.2 and 5 mm, a width of less than 5 cm and a length of less than 10 cm. In a more preferred arrangement, both the width and length of individual gas chambers should be between 5 and 20 mm measured in a straight line. In a general configuration, the width and length of these gas chambers or cavities can be described as orthogonal straight dimensions. In advantageous configurations, at least one of these orthogonal dimensions should be less than about 20 times the thickness of the cavities. In a preferred configuration, at least one of these orthogonal dimensions should be less than about 10 times the thickness of the cavities.

Limiting Microphonics Sensitivity

In order to reduce the microphonics sensitivity of the detector, two schemes can be used, separately or in conjunction. The first scheme is to hold the conductor sheets sandwiched between the dielectric sheets so that the unsupported surface areas remain of relatively small size compared to the distance between the cathode sheets and compared to the thickness of the conducting sheet, in such way that the rigidity of the unsupported sheet is sufficient to limit its motion under gas pressure waves (i.e. sound waves) and other mechanical vibrations. The second scheme is to force the conducting sheet to remain curved, as curved membranes have much higher stiffness than flat ones. Maintaining the conducting sheets curved, such as in a concentric cylindrical configuration, mounted around a curved/arced substrate will provide the conducting sheet and the overall detector structure the rigidity and mechanical ruggedness necessary to limit microphonics sensitivity. A maximum radius of curvature of ~10 m is desirable to create such a benefit. The preferred configuration comprising a substantially concentric cylindrical arrangement with a 10 to 500 mm radius of curvature will provide good performance. Also, a substrate substantially made of a rigid material with a convex curve on at least one side will allow the detector sheets to be wound around and create the desired curvature. In this configuration, a maximum radius of curvature of ~1 m is preferred.

In a preferred example, conducting sheets will be curved and maintained with the dielectric only creating small gas chambers, combining the above mentioned schemes for reducing the microphonics and gamma sensitivity. Also, the anode conductor is preferably held by the dielectric in such a way that no more than about 15 cm segments of the conductor's length are continuously unsupported. Under vibration, an unsupported thin wire could vibrate around its position, causing changes in the electrical configuration of the detector and creating a noise pulse signal that could be mistaken for neutron pulses. By limiting the length of unsupported wires, one limits the amplitude of motion of the wire under a given excitation, lowering the impact of vibration on false counts. In the present invention, the anode wire is sandwiched between two sheets of dielectric holding the anode wire regularly along its length and maintaining a sufficient tension in the wire to avoid substantial lateral motion. This is a major advantage compared to classic tube or straw tube designs, in which the wire is not maintained along its length inside the tube, providing the detector with undesired sensitivity to microphonics and mechanical vibration excitations. In desired configurations, sections of unsupported anode wires should have a length of less than about 5 cm. For applications in noisy environments, preferred configurations will consist of anode wires held about every 2.5 cm or less.

The critical elements in building a neutron detector are as follows. To build efficient neutron detectors using boron or lithium coatings, one has to put the coated surfaces very close to each other to achieve the necessary volumetric density of neutron-reactive material. A common solution is to use a large number of small diameter tubular detectors lined with boron or lithium. Unfortunately, the cost and difficulty of manufacturing tubular detectors rises rapidly as their diameter shrinks. The present invention, by contrast, enables easy assembly of detectors having boron or lithium coated surfaces, with the surfaces maintained at very small distances from one another, without having to coat the inside of a tube nor slide a thin wire inside a very small diameter tube as part of the assembly process. Furthermore, the invention enables the assembly of a detector of significant size made with a continuous anode conductor and continuous cathode conductor, avoiding costly and intricate connections between multitudes of thin anode wires and tubes. In addition, the invention enables a wide variety of shapes and form factors for the detector design as illustrated in the following examples.

EXAMPLE 1

Figure 7:
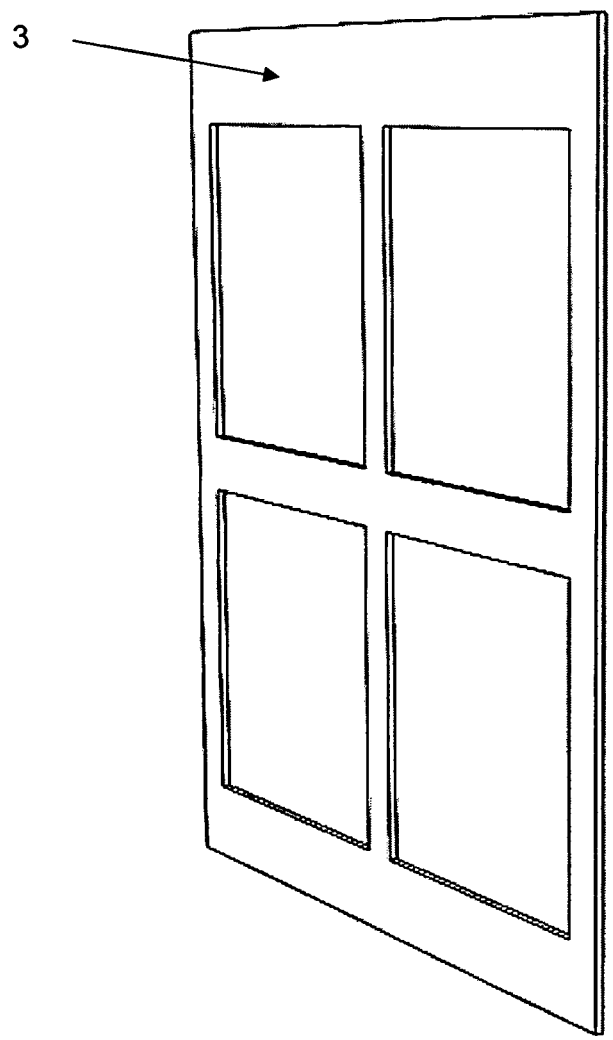
FIG. 7 illustrates a thin flat dielectric sheet cut with four rectangular shaped windows. In several examples of the invention, these sheets are made of Teflon (PTFE).
Figure 8:
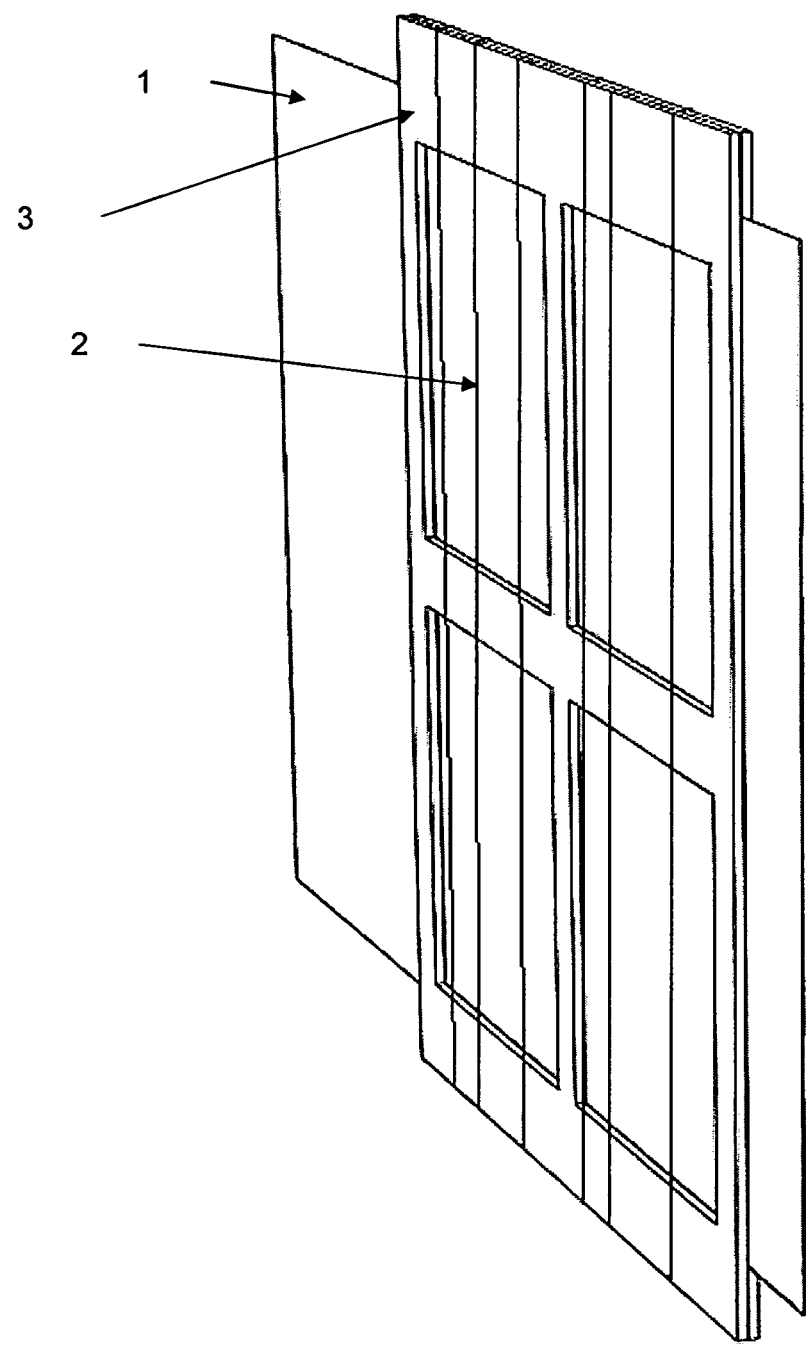
FIG. 8 illustrates two Teflon sheets around a copper sheet coated with boron. A thin anode wire is wound around the Teflon sandwich.
Figure 9:
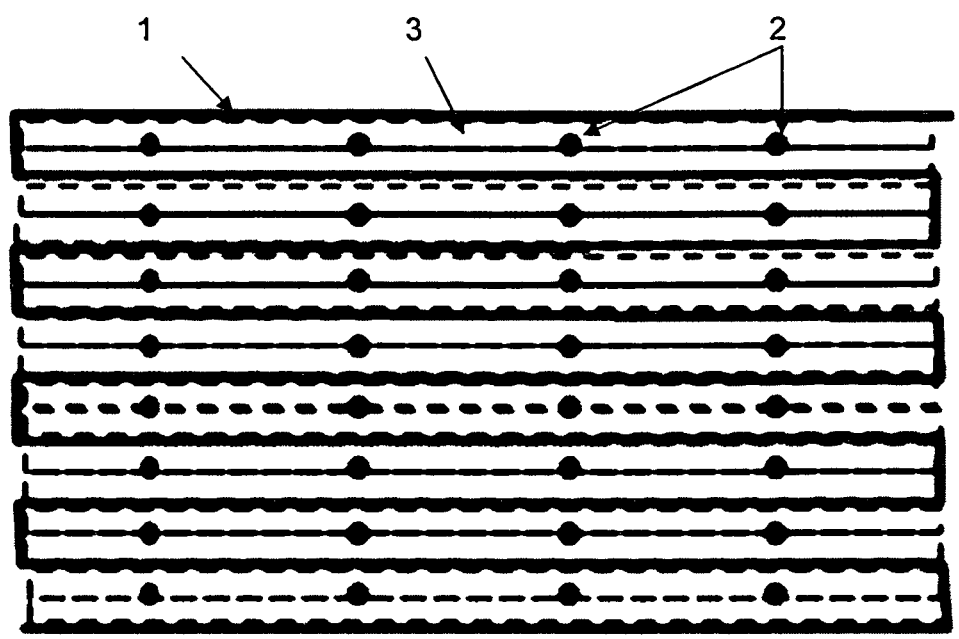
FIG. 9 illustrates a flat multi-layer device made of conductive sheets coated with boron, folded around several layers of a sandwich structure incorporating two dielectric sheets and a thin conductive anode wire.

Flat Stacked Detector: A 35 cm long, 5 cm wide, copper sheet of 50 micrometers thickness was coated with boron layer on both sides. The boron layer consisted of $B_4C$ enriched with 96% B-10 with an average areal density of 0.14 mg/cm$^2$. A set of Teflon sheets 0.5 mm thick×5.5 cm long×3.5 cm wide, were cut with four windows of 1.9 cm on a side, as shown in FIG. 7. Two Teflon sheets were applied against the copper sheet such that the Teflon sheets were centered on the width of the copper sheet. A 25 μm diameter conductive wire was woven around the two Teflon sheets such that the wire did not touch the copper sheet as shown in FIG. 8. A second set of Teflon sheets were then applied onto the first set of Teflon sheets such that the wire was sandwiched between two Teflon sheets on each side of the copper sheet. The copper sheet was then folded around the dielectric-anode sandwich once. This process was repeated four more times, creating a 2 cm thick structure comprising five layers of copper sheets and Teflon windows with a thin conductive wire woven between the Teflon sheets, as illustrated in FIG. 9. The conductive wire was connected to the input of an Ortec 142PC preamplifier, which in turn was connected to a shaping amplifier. The output of the shaping amplifier was read by an Ortec Trump PCI Multi-Channel Analyzer. The copper sheet was connected to the grounded vacuum enclosure in which the device was placed. The air in the enclosure was pumped out to create vacuum, following which the enclosure was refilled with about 1 atm of P-10 gas (90% Ar/10% methane). The neutron response of the device was tested using a thermalized neutron flux and neutron detection efficiency was measured to be approximately 10%.

It will be appreciated that the frame-like dielectric structure illustrated schematically in FIG. 7 may be a substantially monolithic sheet with (typically rectangular) holes or windows cut therein or, alternatively, it may be formed from several pieces by bonding individual dielectric strips onto the cathode sheet in a pattern that mimics overall the desired frame-like configuration. It will be further appreciated that although the anode wires preferably comprise segments of a single wire that is woven or wound back and forth between opposite edges of the frame-like dielectric structure, they may alternatively comprise a set of individual wires that are later joined to a common bus.

EXAMPLE 2

Figure 10:
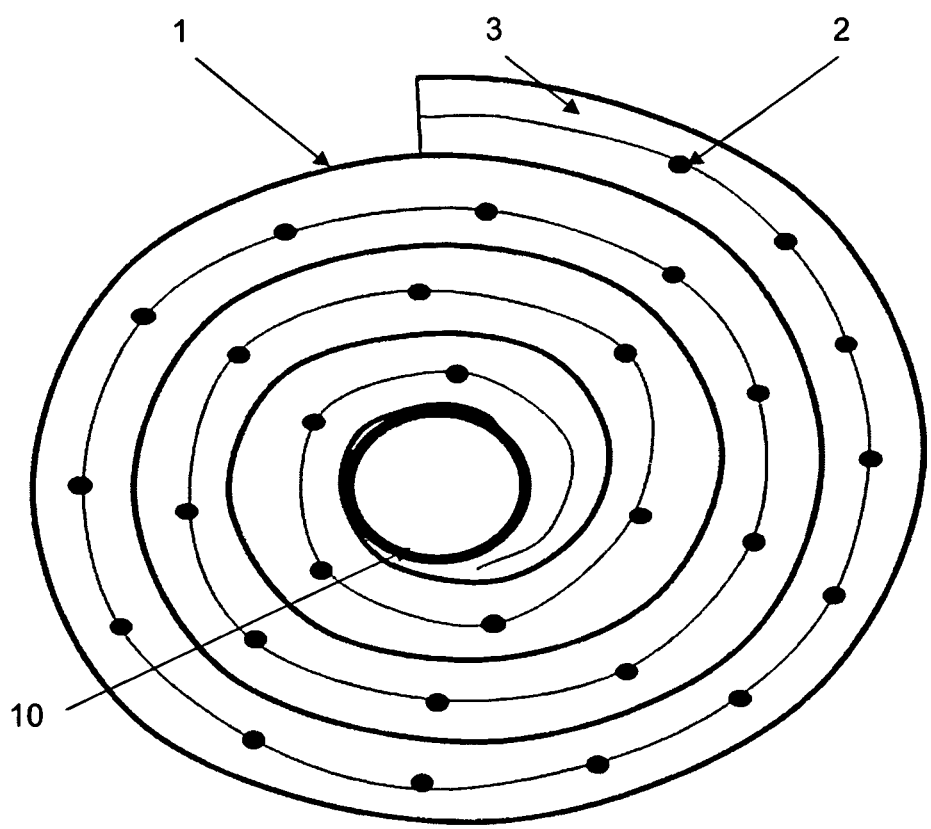
FIG. 10 illustrates schematically a cross sectional view of a spiral configuration of the detector according to one example of the invention, showing the copper sheet rolled into a spiral (thick trace) held by the Teflon strips which sandwich the anode wire woven longitudinally (perpendicular to the cross section) along the spiral like structure.

Cylindrical Detector with Single Copper Sheet in Spiral Configuration: A 0.05 mm thick copper sheet of 63 cm length and 15.2 cm width was coated on both sides with boron carbide isotopically enriched to 96% B-10. The average coating thickness was about 0.5 μm. The coating was applied to the copper sheet in strips of around 12 mm width with around 3 mm separation between the coated strips along the length of the sheet. The last 2.5 cm at one end of the copper sheet and the last 10 cm at the other end were left uncoated, enabling the uncoated portion of the copper sheet to constitute the outer surface of the detector when the detector is closed and sealed. Strips of Teflon 3 mm wide were prepared with adhesive on each side. Two strips 6 mm wide were prepared similarly and V-shaped notches were made on one side every 4 mm. A length of 1.6-cm diameter copper tubing 10 was used as the substrate. The end of the copper sheet was rolled around the copper tube and maintained in place with adhesive. Once the boron coating started to engage around the tube, Teflon strips were placed to create separation between the spiral layers. One set of strips was placed on the copper sheet not yet rolled, and one set was placed on the already rolled part of the sheet. A 0.025 mm diameter tungsten wire was woven from one side of the copper sheet to the other through the notches on the Teflon strips, as the copper sheet was rolled into a spiral. This process created a six-layer structure having an outside diameter of 3.3 cm and of 15 cm length, illustrated by the cross sectional view in FIG. 10. The anode wire was connected to the central connector of an electrical feedthrough, and the copper sheet to the body of a vacuum enclosure. The device was baked under vacuum for a sufficient duration to eliminate most impurities and contaminants from the vacuum chamber, and then filled with 0.75 atmospheres of P-10 gas (90% argon, 10% methane). When the device was tested under exposure to a fluence of 6700 thermalized neutrons per second, it yielded a count rate of 1672 counts per second. (The strength of the neutron field was estimated using an MCNP simulation of the neutron source in the test configuration.)

Applicants conducted simple vibration tests to characterize vibration sensitivity and found that the cylindrical configuration (Example 2) was much less sensitive than the detector in a configuration having flat coated surfaces (Example 1). This result can be explained by describing the mechanical integrity of a flat membrane compared to a curved membrane. When a membrane is submitted to a pressure pulse on one side, e.g. an acoustic pressure wave, the stiffness of the membrane, e.g. the ratio of the deflection to the applied pressure, is minimal when the membrane is flat. In other words, when plotting the deflection versus the applied pressure, the curve has an inflection point of minimal slope at the point of zero deflection. When flat, a membrane will deform in a pure flexure mode, presenting minimal resistance to deformation, whereas, when curved, deformation of the membrane will combine flexure and elongation of the membrane, significantly increasing its resistance to deformation. Therefore, a given pressure pulse on one side of a membrane will cause a much larger deflection to a flat membrane than to a curved membrane. In a detector in which a capacitor is formed by the anode and cathode, a change in the distance between the anode and cathode (caused by deflection of one or both of them), will change the capacitance of the detector, thereby producing a spurious charge pulse. The charge pulse Q that will result from a sudden change in detector capacitance may be expressed as $Q=CV$ (where Q is the accumulated charge, C is the capacitance, and V the applied voltage). The capacitance of the detector is a function of d, the distance between the capacitor plates $C=\epsilon^*A/d$, (where A is the capacitor surface and $\epsilon^*$ is the permittivity of the space between the plates). When a pressure wave is applied on one of the capacitor plates, causing it to move relative to the other plate, then the distance between the plates changes; this produces a change in capacitance, which in turn generates a charge pulse in the detector output. The smaller the deflection of the cathode plate when exposed to a given acoustic pressure wave, the smaller the resulting charge pulse created in the readout electronics, and thus the smaller the microphonic sensitivity of the detector.

EXAMPLE 3

Figure 11:
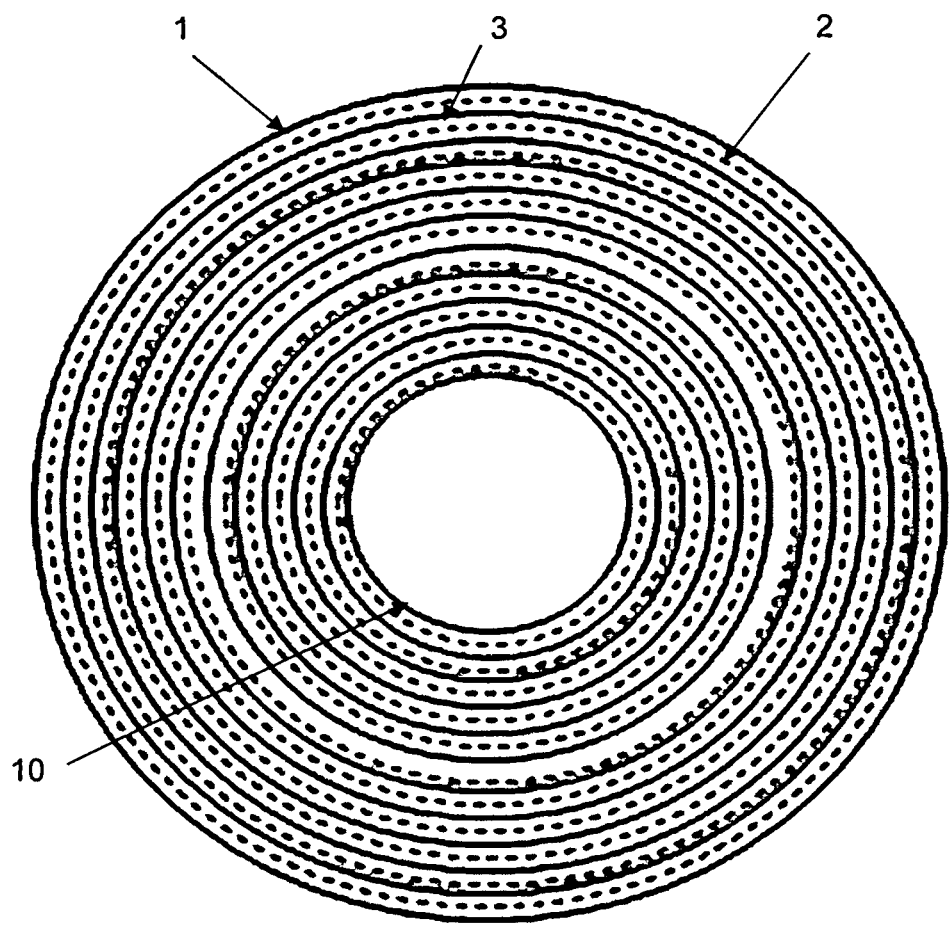
FIG. 11 illustrates schematically a detector comprising 12 concentric cylinders, coated on both sides with a layer of boron according to one example of the invention.

Concentric Cylindrical Tubes: In a conceptual design validated by simulation, a central cylinder, having an outer diameter of 12 mm, is coated on its outer surface with a boron layer having a thickness of about 1 micrometer. A ring made of dielectric sheet-like material, having an inside diameter substantially equal to the outer diameter of the copper cylinder, such that it fits around said copper cylinder, and having a thickness of about 0.7 mm and a length of 6 mm is applied at each extremity of the cylinder in such a way that half of its length lies against the copper cylinder, and the other half extends beyond the copper cylinder. The outer edges of the dielectric rings are cut to create a series of notches spaced about every 4 mm and about 1 mm deep. A 0.025 mm conductive wire is woven from one ring to the other, hooking onto each ring via the small notches described above. The distance between each loop of wire is thus about 4 mm. A second set of rings is applied on the first set, in such a way as to sandwich the conductive wire between the two sets of dielectric rings. A second thin walled copper cylinder is applied around the second set of dielectric collars, creating a gas gap between the two conductive cylinders and the dielectric rings. The process is repeated for 11 more layers, forming a 12-layer concentric cylindrical detector, as illustrated in FIG. 11. Such a device has been simulated using MCNP, and yields a calculated detection efficiency of 58% for thermalized neutrons.

EXAMPLE 4

Figure 12:
FIG. 12 illustrates schematically a curved substrate around which is wound the copper sheet of a detector according to one example of the invention.

Stacked Around a Curved Substrate: In a conceptual design validated by simulation, an apparatus similar to that of Example 1 has the significant difference that the layers are stacked against a substrate 10' that has a radius of curvature of 1.5 m as illustrated in FIG. 12. The device is constructed to make 12 layers of copper sheets coated on both sides with about 0.5 μm of boron-10. MCNP simulation of this device under a thermal neutron flux has been performed and results show a calculated detection efficiency of 30% for an 18 mm thick detector.

EXAMPLE 5

Detector Layers between Layers of Moderator: In a conceptual design, a device containing interlayered neutron detector layers and moderator layers will provide enhanced sensitivity for neutrons across a wide range of energy. In applications in which detection of neutrons of several energies is of interest, individual detector layers, or sets of detector layers can be interlaid between layers of moderating materials such as hydrogenated plastics, water, or other materials as described in Applicants' U.S. Pat. Nos. 7,923,698; 7,514,694; and 7,919,758, the entire disclosures of which are incorporated herein by reference. In such a device, layers closer to the front of the detector will be more sensitive to neutrons of lower energy, while layers placed behind a thicker amount of moderator will be more sensitive to neutrons of higher energy, providing a detector capable of detecting neutrons across a wide energy range with high efficiency, while producing a detection pattern that can be used to discriminate between neutrons of low energy and those of higher energy. The device will consist of three layers. Each layer comprises two layers of detecting elements as described above (e.g. two conducting sheets coated with boron kept at a desired separation distance of about 1.5 mm by a dielectric sandwich, holding an anode conductor equidistant from the conductive sheets) and one layer of high density polyethylene of 2.4 cm thickness. Boron coatings will be about 0.5 micrometer thick. The size of the device will be 30 cm wide and 200 cm high. A layer of HDPE of 0.5 cm thick is placed in front of the first detection layer. As described, MCNP simulation of the device indicates a detection efficiency of 13.7% for thermal neutrons and 10.8% for neutrons with a fission spectrum energy distribution entering the detector from its front surface.

Deposition Techniques

Figure 15A:
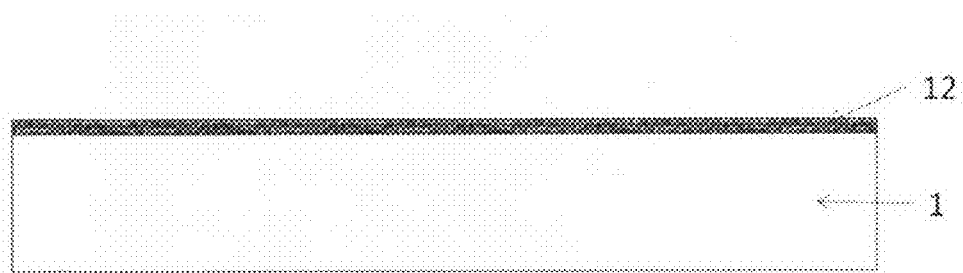
FIG. 15 illustrates several alternative methods of applying a boron coating in accordance with several examples of the invention.

In the foregoing examples, the boron layer was created by depositing $B_4C$ powder enriched in B-10 at about 96%, onto an adhesive layer, as shown schematically in FIG. 15 and described more fully in the following example.

EXAMPLE 6

Figure 13:
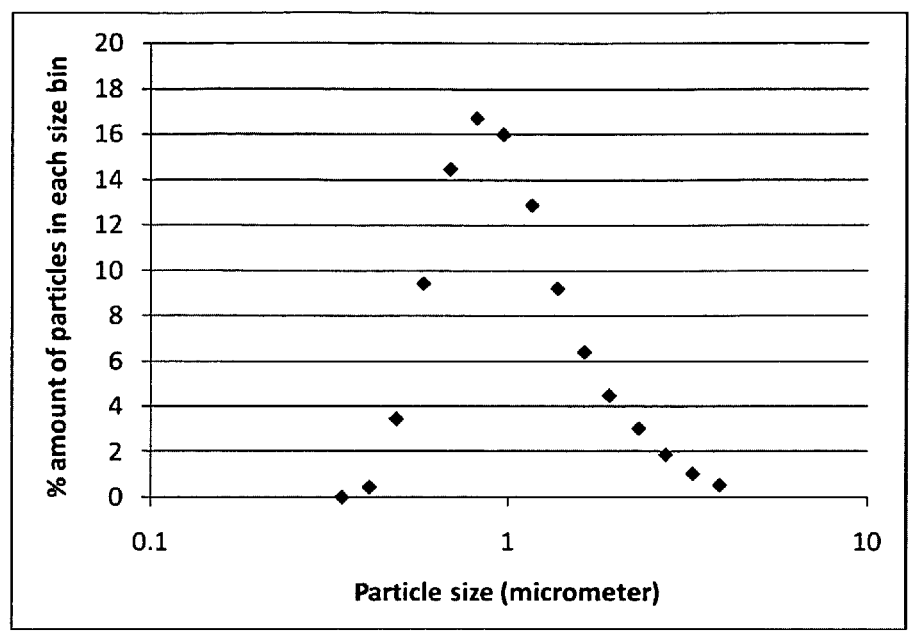
FIG. 13 illustrates the particle size distribution of one example of boron carbide powder suitable for carrying out the invention.
Figure 14:
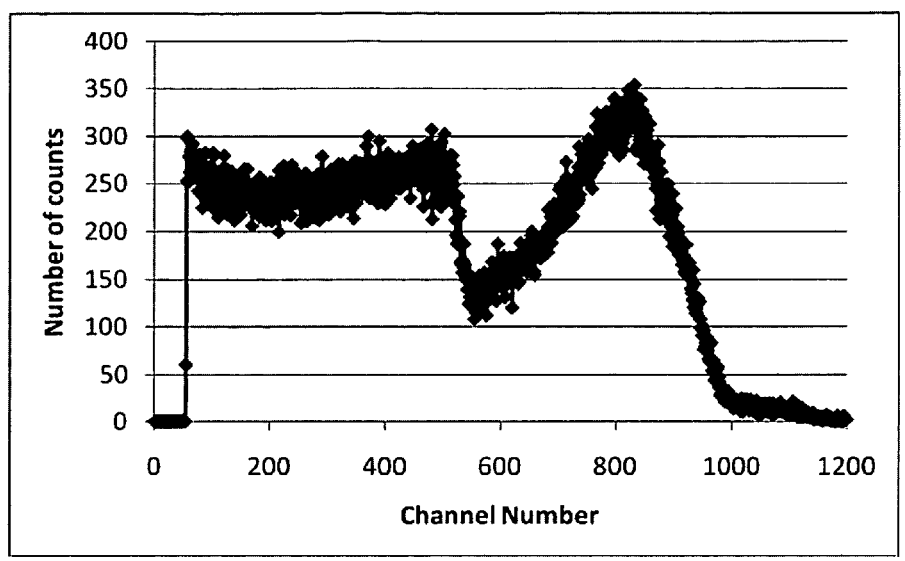
FIG. 14 illustrates a pulse height spectrum measured with a detector built in accordance with one example of the invention.
Figure 15B:
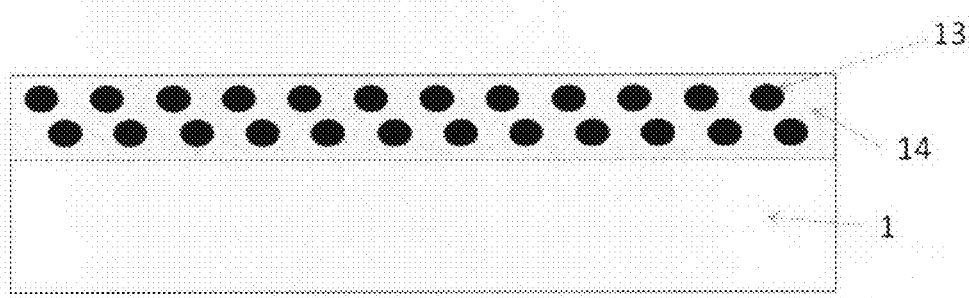
Figure 15C:
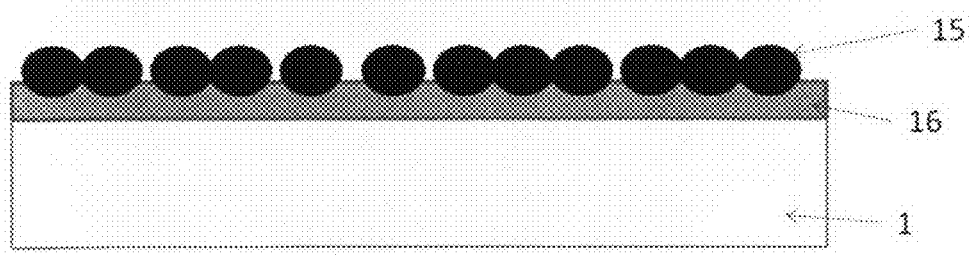

Referring to FIG. 15C, a 0.05 mm thick stainless steel sheet 1 is coated with acrylic based adhesive layer 16 of 0.1 mm thickness. A boron carbide powder 15 enriched with 96% boron-10 with a particle size distribution as shown in FIG. 13 having a mean particle size of 0.866 μm (Ceradyne Boron Products, Quapaw, Okla.) and applied against the adhesive layer in a two step process. The first step consists of pressing the powder onto the adhesive to create a good bond between the particles and the adhesive layer, and then in the second step the layer of powder deposited on the adhesive is brushed in order to remove any loose particles that would otherwise increase the coating thickness beyond the desired amount and perhaps shake loose during detector operation. After the adhesive layer cures, it cements the boron particles in place, creating a boron coating of effectively uniform thickness with minimal adhesive on top of the boron particles and with the boron particles strongly adhering to the substrate. The coated stainless steel sheet is rolled in a cylindrical shape and inserted inside a stainless steel tubing of 1.9 cm diameter. An anode wire is held at the center of the tubing and connected to the input of a charge sensitive preamplifier that connects to a shaping amplifier and a multi-channel analyzer. The tubing is then sealed and vacuum is created inside to remove impurities and electronegative elements. The tubing is then filled with one atmosphere of argon. The detector is placed under a thermalized neutron flux and the pulse height spectrum is measured. The pulse height spectrum is shown in FIG. 14.

It will be appreciated that in some instances, performance may be enhanced by increasing the electrical conductivity of the coating, because an insulating coating may partially shield the electric field of the cathode sheet. Conductivity of the coated layer may be improved by any of several methods, including minimizing the thickness of the coating (since it is a resistive material), minimizing the thickness of the adhesive, using an inorganic form of B or Li that has relatively high conductivity instead of a compound with lower conductivity, and using an electrically conductive adhesive. Both isotropic and anisotropic conductive adhesives are well known in the art.

Applicants have discovered that using this type of neutron reactive coating can be used in other types of neutron detectors such as boron lined tubes, boron lined straws, Micromegas, and other multi-wire proportional counters.

In addition to the exemplary adhesive coating process, many other suitable processes can be used. Skilled artisans will recognize that each process has its own advantages and disadvantages, and the process to be used for any particular application may be selected through routine experimentation.

Deposition by evaporation using electron beam or magnetic sputtering (FIG. 15A): These techniques consist of evaporating the boron or boron carbide by heating the compound under vacuum at very high temperature using a concentrated electron beam or magnetic sputtering heater. The substrate 1 is placed in front of the boron compound to be evaporated. When the boron evaporates, a portion of the boron evaporated particles condense onto the cold substrate to form a thin substantially uniform coating 12. The process is advantageous in the way that it can create a very uniform coating. Two drawbacks of this technique are that it is difficult to coat the inside of a small diameter tube, and coating a large surface can be expensive both in terms of capital equipment and operation. Also, a significant amount of boron can be lost in the process as some boron can condense and deposit on the walls of the vacuum chamber instead of on the substrate.

Boron and boron carbide can be deposited via a co-electrodeposition technique. In such a process, boron particles are mixed in a bath of nickel, for example. A potential is applied to the substrate, attracting the conductive elements in the bath to the substrate and causing them to deposit onto it. Simultaneously, the boron particles deposit on the substrate and are cemented by the nickel coating. This technique has the advantage of being very inexpensive and scalable for large volume production as co-deposition techniques are well understood and used in many industries today. The major drawback of this technique relates to the fact that the boron particles can be surrounded by the metal in the co-deposition and this metal will shield the neutron capture reaction products, reducing their energy as they travel towards the detector gas volume and thus preventing them from depositing the maximum amount of energy in the gas.

Referring to FIG. 15B, boron-containing particles 13 can also be mixed into a paint 14 and applied on the substrate 1 as a paint coating. Although this process can be very cost effective, it has a drawback in that some of the boron particles will be located deep in the paint layer and the reaction products from neutrons captured in those particles will experience significant self-shielding, reducing their effectiveness in producing detection events.

In either the spiral or concentric multi-plate configurations a central space is typically created inside the detector volume, and it will be appreciated that this space can be used for other functions, such as for detector electronics, moderating material, other materials sensitive to other types of radiation, such as gamma or x-ray, or for other sensors that would complement the neutron detection capability of the device, e.g. temperature, GPS, orientation, wireless communication or user interface.

Conducting Sheets

The conducting sheets can be made of any conducting material such as copper (about $10^{-8}$ ohm·m), steel (about $10^{-7}$ ohm·m), and aluminum ($2.8 \times 10^{-8}$ ohm·m); intrinsic silicon has a resistivity of about $6.4 \times 10^{2}$ ohm·m, but with appropriate dopant, it can be made sufficiently conducting for the purposes of the invention. Applicants prefer to use any conductor with a resistivity lower than about $10^{-1}$ ohm·m. With this resistivity, the resistance between the two extremities of the cathode will be of the same order of magnitude as the resistance of the stainless steel wire having 0.025 mm diameter and 35 m in length, used in Example 2. The material may be chosen based on cost, availability, formability, ease of manufacturability, and ease of soldering, joining, and making electrical connections. The sheet thickness can be as thin as 5 micrometers, and should be chosen to maintain appropriate rigidity to the structure. In one preferable example, sheets would be made of steel, aluminum or copper, with a thickness between 10 μm and 2 mm. A more preferred device uses a copper sheet of 20 to 400 μm thick. As used herein, the term steel includes all iron alloys, including mild or carbon steel and stainless steel.

Neutron Reactive Coating

Boron-10 or lithium-6 can be used as neutron-reactive materials coated on one or two sides of the conducting sheet. Coating thickness should be sufficient for good neutron detection sensitivity, but not too thick so as to avoid self-shielding. Coating thickness with an areal density of boron-10 between 0.024 mg/cm$^2$ and 0.48 mg/cm$^2$ is desired for good performance. A preferred range would be between 0.048 mg/cm$^2$ and 0.24 mg/cm$^2$. The boron may be in any inorganic form, including boron, boron carbide, boron nitride, etc. Deposition techniques to be used to coat the boron can be evaporation, adhesive, sol-gel, or other familiar processes. Lithium-6 or a combination of lithium-6 and boron-10 can be used to enhance the detection efficiency. Lithium may be used in the form of a selected inorganic compound, such as lithium fluoride, lithium carbonate, lithium oxide, lithium hydride, lithium borate, etc. In the case of an adhesive technique, boron or boron carbide particles with mean particle size between 0.5 and 5 micrometers are desired for good performance.

Dielectric Sheet

The dielectric sheet can be made of any hard or flexible dielectric materials such as ceramic or insulating plastics, including alumina, Teflon (PTFE), polyethylene, Kapton, polyimide, and other polymers and polymer composites. The thickness of the dielectric material is one of the factors that helps determine the volumetric density of the neutron-reactive material in the overall detector volume. The thinner the dielectric material, the smaller the detector, and thus the greater the neutron sensitivity per unit of detector volume. Detectors made with dielectric sheets of 10 mm thick will work well. For higher sensitivity per volume, sheets of 5 mm or less are preferable. Sheets creating a separation between the cathodes of less than 3 mm yield enhanced neutron detection sensitivity. Dielectric can be cut in strips or have windows or grids cut in them to create small gas-filled chambers inside the detector. For enhanced performance and minimum self-shielding, the neutron-reactive coating should not be present on the portions of the conducting sheet in contact with the dielectric sheets. Masks can be used to create a coating pattern corresponding to the dielectric cut-out.

Anode Conductor

The anode can be made of flat sheet conducting material, wire mesh, grids, or thin wires. Most preferred are thin wires, as they enable gas electron multiplication and reduce the overall capacitance of the detector. Thin anodes can be placed at distances that enable detection of most ionizations created by neutron capture reactions. If conductors are placed too far apart compared to the distance between the two conducting plates, portions of the volume inside the detector will not have sufficient electric field to enable detection of the ionizations. If they are placed too close to each other, adjacent conductors will reduce the electric field in their vicinity and reduce the gas multiplication factor, as well as increase the capacitance of the detector. Desired range for the ratio of the distance between the wires over the distance between the plates is to be between 0.4 and 10. A preferred ratio would be between 0.8 and 5. For example, with plates separated by 1.5 mm, and wires spaced apart by about 4 mm, good performance can be obtained. Anode wires of 0.025 mm diameter have been found to generate minimal capacitance and high gas multiplication.

Skilled artisans will recognize that several techniques for holding the anode wires exist. Anode wires can be held by one of the following means: adhesive against the dielectric or sandwiched between two dielectric sheets with adhesive, cast within the dielectric thickness, soldered against a copper pad onto the dielectric surface, embroidered through the dielectric sheet with a second thread/wire maintaining its tension, or weaved around a substrate.

The gas volumes of the detector can be filled with detector gases such as argon, helium, methane, or neon or combinations of these gases. Preferred gas mixtures include, but are not limited to, argon with 10% methane [P-10], or mixture of argon and $CO_2$; such gases combine an ionizable gas such as argon or neon and a quench gas such as methane or carbon dioxide. Through routine experimentation, the skilled artisan can adjust gas pressure according the actual size of the detector and separation of the cathode plates and type of gas being used. For 1.5 mm plate separation, 0.75 atmospheres of P-10 has been found to work well.

Figure 16:
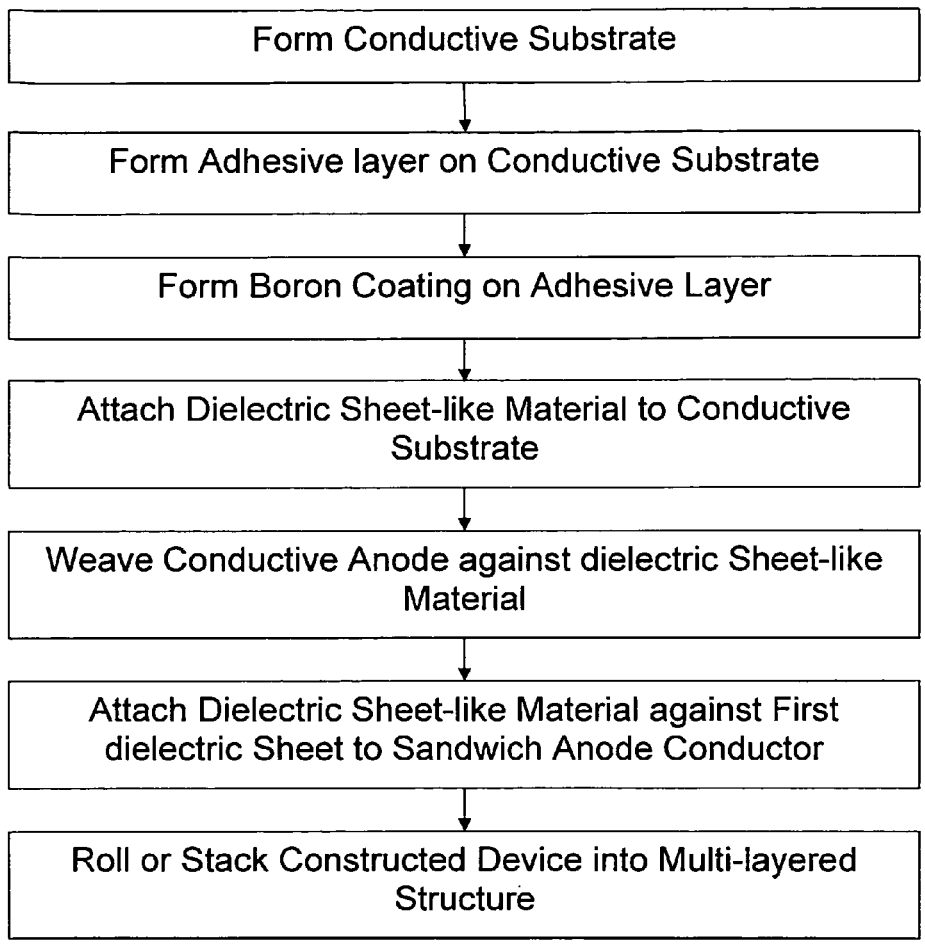
FIG. 16 illustrates schematically the steps in a process suitable for fabricating a detector structure according to one example of the invention.

To summarize the engineering considerations and design tradeoffs that are available to the artisan in constructing the inventive detector following the process illustrated in FIG. 16: The cathode sheet is preferably copper, 10 µm to 2 mm thick, and more preferably 20 µm to 0.4 mm thick; the main consideration being adequate flexibility to conform to the desired shape and adequate rigidity to minimize microphonic noise. The dielectric is preferably 0.05 to 10 mm thick, and more preferably 0.25 to 5 mm thick; the main consideration being a compromise between gas gain and capacitance and sensitivity (boron density per unit volume of detector). The anode wires are preferably 5 µm to 1 mm in diameter, and more preferably 20 to 100 µm in diameter; the main consideration being a compromise between gas gain and capacitance, along with fabricability (the wires must be strong enough to avoid breaking during fabrication of the assembly). The anode wires need to be spaced no more than 20 times the spacing between the cathode plates, and preferably spaced apart by 0.4 to 10 times the spacing between cathode plates, and more preferably by 0.8 to 5 times the spacing between cathode plates; the main consideration being a compromise between detecting most neutron capture events and limiting capacitance. The dielectric sheets preferably cover less than about 80% of the cathode area, and more preferably less than about 50% of the cathode area; the main consideration being to increase neutron sensitivity without increasing gamma sensitivity, and to maintain adequate mechanical support for the anode wires. The lateral size of the gas chambers (bounded on two faces by the cathode sheets and on the other faces by the dielectric material) is preferably 1 to 200 times the thickness (i.e., the spacing between cathode plates), more preferably 5 to 20 times the thickness; the main consideration being to increase neutron sensitivity without increasing gamma sensitivity, and minimize lateral vibration of the anode wires as a source of microphonic noise.

The process for making the inventive detector can, in some cases, be considered as the progressive buildup of a number of modules, where an individual module comprises a conductive cathode sheet, coated on at least one side with neutron-reactive material, and a plurality of generally parallel anode wires strung between framelike sheets of dielectric, which are attached to one face of the cathode sheet so that the anode wires are held parallel to the surface of the cathode sheet and the framelike dielectric sheets serve to outline one or more generally rectangular spaces that can later be filled with gas.

The aforedescribed modules can then be stacked to form a generally rectangular prism with enclosed gas spaces (containing the anode wires) that define rectangular prisms with one dimension substantially smaller than the other two. Alternatively, the modules can be bent and stacked on a curved form or mandrel so that they are generally parallel, with the anode wires running parallel to the axis of curvature. In this case, the enclosed gas-filled spaces define sections of a thin annular prism with the small dimension in the radial direction.

In all cases, adjacent cathode sheets lie substantially parallel to one another, with the understanding that the term "parallel" as used herein encompasses both (1) flat sheets lying in parallel planes; and (2) curved sheets having a substantially common axis of curvature, whether they are separate, substantially cylindrical sheets, or are segments of one spiral-wound sheet.

We claim:

1. A neutron detector comprising:
a conductive cathode sheet having a thickness less than about 1 mm, coated with neutron reactive material on at least one surface thereof, and formed into a selected shape in which selected portions of said sheet are facing other selected portions of said sheet;
dielectric material separating said facing portions, said dielectric material having a thickness less than about 5 mm and covering less than about 80% of the surface area of said facing portions of said cathode sheet;
a plurality of anode wires of diameter less than about 1 mm, generally parallel to said facing portions of said cathode sheet and separated therefrom by said dielectric, with the distance between adjacent anode wires being no more than 20 times the distance between said facing portions of said cathode sheet; and,
an ionizable gas in the space adjacent to said cathode sheets and said anode wires;
wherein said selected shape is formed by folding said cathode sheet around rectangular frames of said dielectric material so that said facing portions of said cathode sheet are substantially flat rectangles and define opposite surfaces of a gas cavity in the shape of a rectangular prism with said anode wires therein, and,
a plurality of said folds are formed consecutively, thereby forming a stack containing a plurality of said gas cavities, wherein each rectangular portion of said cathode sheet forms a cathode surface in two adjacent gas cavities, one on either surface of said cathode sheet.

2. The neutron detector of claim 1 wherein said dielectric material is selected from the group consisting of: polymers and polymer composites.

3. The neutron detector of claim 1 wherein said neutron reactive material comprises an inorganic material containing an isotope selected from the group consisting of: boron-10, and lithium-6.

4. The neutron detector of claim 1 wherein said cathode sheets are coated with said neutron reactive material by a process selected from the group consisting of: adhesive bonding, painting, vapor deposition, and sputtering.

5. The neutron detector of claim 1 wherein the distance between adjacent anode wires is between about 0.4 and 10 times the distance between said cathode plates.

6. The neutron detector of claim 1 wherein the distance between adjacent anode wires is between about 0.8 and 5 times the distance between said cathode plates.

7. The neutron detector of claim 1 wherein said dielectric material has a thickness of less than about 3 mm.

8. The neutron detector of claim 1 wherein said cathodes and said dielectric material define gas cavities wherein said gas cavities have a thickness, defined as the distance between said cathode sheets, and two orthogonal straight dimensions, wherein at least one of said orthogonal dimensions is less than 20 times said thickness.

9. The neutron detector of claim 8 wherein at least one of said orthogonal dimensions is less than about 10 times said thickness.

10. A neutron detector comprising:
a conductive cathode sheet having a thickness less than about 1 mm, coated with neutron reactive material on at least one surface thereof, and formed into a selected shape in which selected portions of said sheet are facing other selected portions of said sheet;
dielectric material separating said facing portions, said dielectric material having a thickness less than about 5 mm and covering less than about 80% of the surface area of said facing portions of said cathode sheet;
a plurality of anode wires of diameter less than about 1 mm, generally parallel to said facing portions of said cathode sheet and separated therefrom by said dielectric,
a plurality of anode wires of diameter less than about 1 mm, generally parallel to said facing portions of said cathode sheet and separated therefrom by said dielectric, with the distance between adjacent anode wires being no more than 20 times the distance between said facing portions of said cathode sheet; and,
an ionizable gas in the space adjacent to said cathode sheets and said anode wires;
wherein said selected shape is formed by rolling said cathode sheet into a spiral shape, with said dielectric material separating adjacent turns of said cathode sheet so that said adjacent turns define opposite surfaces of a gas cavity in the approximate shape of a segment of an annular prism.

11. The neutron detector of claim 10 wherein said dielectric material is selected from the group consisting of: polymers and polymer composites.

12. The neutron detector of claim 10 wherein said neutron reactive material comprises an inorganic material containing an isotope selected from the group consisting of: boron-10, and lithium-6.

13. The neutron detector of claim 10 wherein said cathode sheets are coated with said neutron reactive material by a process selected from the group consisting of: adhesive bonding, painting, vapor deposition, and sputtering.

14. The neutron detector of claim 10 wherein the distance between adjacent anode wires is between about 0.4 and 10 times the distance between said cathode plates.

15. The neutron detector of claim 10 wherein the distance between adjacent anode wires is between about 0.8 and 5 times the distance between said cathode plates.

16. The neutron detector of claim 10 wherein said dielectric material has a thickness of less than about 3 mm.

17. The neutron detector of claim 10 wherein said cathodes and said dielectric material define gas cavities wherein said gas cavities have a thickness, defined as the distance between said cathode sheets, and two orthogonal straight dimensions, wherein at least one of said orthogonal dimensions is less than 20 times said thickness.

18. The neutron detector of claim 10 wherein at least one of said orthogonal dimensions is less than about 10 times said thickness.

* * * * *